(12) United States Patent
Bourne et al.

(10) Patent No.: US 9,355,002 B2
(45) Date of Patent: May 31, 2016

(54) CAPTURING TRACE INFORMATION USING ANNOTATED TRACE OUTPUT

(71) Applicant: GLOBALFOUNDRIES INC., Grand Cayman (KY)

(72) Inventors: Donald A. Bourne, Toronto (CA); Albert A Chung, Cary, NC (US); Dana L. Price, Cary, NC (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 158 days.

(21) Appl. No.: 13/912,231

(22) Filed: Jun. 7, 2013

(65) Prior Publication Data

US 2014/0365833 A1      Dec. 11, 2014

(51) Int. Cl.
*G06F 11/00* (2006.01)
*G06F 11/30* (2006.01)
*G06F 11/36* (2006.01)

(52) U.S. Cl.
CPC .......... *G06F 11/3072* (2013.01); *G06F 11/302* (2013.01); *G06F 11/3636* (2013.01)

(58) Field of Classification Search
CPC  G06F 11/3476; G06F 11/302; G06F 11/3072
USPC .......................................................... 714/45
See application file for complete search history.

(56) References Cited

U.S. PATENT DOCUMENTS

| | | | |
|---|---|---|---|
| 7,058,928 B2 | 6/2006 | Wygodny et al. | |
| 7,870,369 B1 * | 1/2011 | Nelson et al. | ................. 712/220 |
| 8,140,911 B2 | 3/2012 | Borghetti et al. | |
| 8,296,740 B2 | 10/2012 | Roesner et al. | |
| 8,316,353 B2 | 11/2012 | Aoyama et al. | |
| 8,719,791 B1 * | 5/2014 | MacPherson | ....... G06F 11/3636 717/104 |
| 2002/0129309 A1 * | 9/2002 | Floyd | .................... G06F 11/261 714/724 |
| 2003/0088854 A1 * | 5/2003 | Wygodny et al. | ............. 717/130 |
| 2008/0155339 A1 * | 6/2008 | Lowe et al. | ...................... 714/38 |
| 2008/0320437 A1 * | 12/2008 | Maennel | ............. G06F 11/3604 717/105 |
| 2009/0241096 A1 * | 9/2009 | Borghetti et al. | ............. 717/128 |
| 2009/0292941 A1 * | 11/2009 | Ganai | ................... G06F 11/366 714/2 |
| 2013/0091387 A1 * | 4/2013 | Bohnet et al. | ................ 714/38.1 |

(Continued)

FOREIGN PATENT DOCUMENTS

EP        2107542 A1     7/2009

OTHER PUBLICATIONS

U.S. Appl. No. 14/490,950, entitled "Capturing Trace Information Using Annotated Trace Output", filed Sep. 19, 2014.

*Primary Examiner* — Yair Leibovich
(74) *Attorney, Agent, or Firm* — Scully, Scott, Murphy & Presser, PC

(57) ABSTRACT

A computer receives a first trace output, generated during a first execution of a first program, that is annotated with an indication of a first pattern of logged events and one or more second programs that identify additional logged events. The computer identifies the first pattern of logged events in a second trace output, which is generated during a second execution of the first program. The computer executes the one or more second programs to identify one or more additional logged events that are discoverable during the second execution of the first program, wherein the one or more additional logged events are not included in the first trace output. The computer determines that the end first pattern of logged events in the second trace output has been reached. The computer ceases execution of the one or more second programs.

16 Claims, 3 Drawing Sheets

(56) References Cited

U.S. PATENT DOCUMENTS

2014/0068568 A1* 3/2014 Wisnovsky ......... G06F 11/3664 717/128
2014/0089741 A1* 3/2014 Kadowaki ........... G06F 11/3636 714/45
2014/0365833 A1 12/2014 Bourne et al.
2015/0006961 A1* 1/2015 Bourne et al. ................. 714/37

* cited by examiner

CAPTURING TRACE INFORMATION USING ANNOTATED TRACE OUTPUT

FIELD OF THE INVENTION

The present invention relates generally to the field of identifying the sources of program errors, and more particularly to capturing logged events to identify the source of an error.

BACKGROUND OF THE INVENTION

Often during the use of programs errors occur which were not expected. These errors are not predicted during the development and testing phase of the program. These types of errors are often only discovered post release of the program to the public. It can often be difficult to identify the root cause of the error due to the seemingly random circumstances which caused the error to exist. However, the identification of the source of error and the subsequent modification, or patching, of the program is often of great interest to those who developed the program.

SUMMARY

Embodiments of the present invention provide a system and program product to capture event information. A computer receives a first trace output, generated during a first execution of a first program, that is annotated with an indication of a first pattern of logged events and one or more second programs that identify additional logged events. The computer identifies in a second trace output, generated during a second execution of the first program, the first pattern of logged events. Responsive to the identification of the first pattern of logged events in the second trace output, the computer executes the one or more second programs to identify one or more additional logged events that are discoverable during the second execution of the first program, wherein the one or more additional logged events are not included in the first trace output. The computer determines that the end first pattern of logged events in the second trace output has been reached. Responsive to the determination that the end first pattern of logged events in the second trace output has been reached, the computer ceases execution of the one or more second programs.

DETAILED DESCRIPTION

Figure 1:
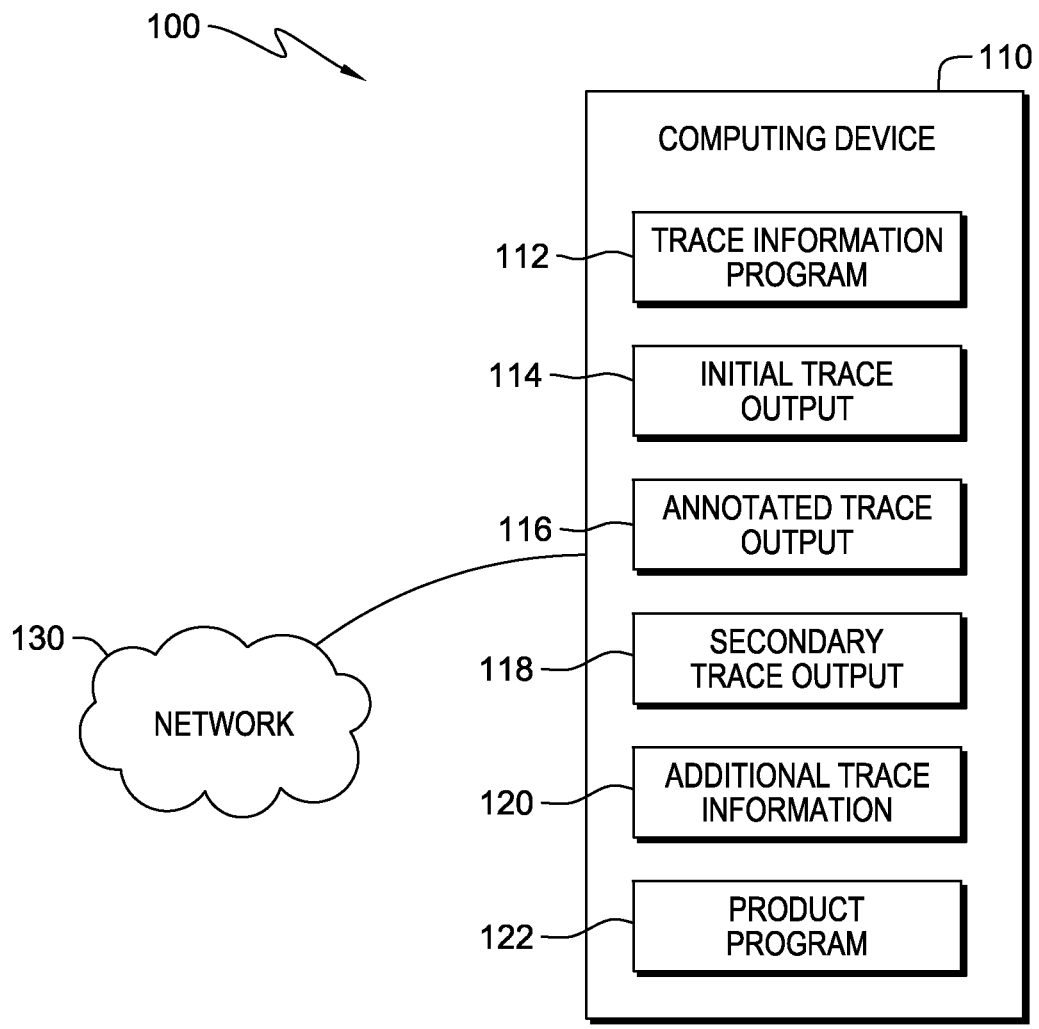
FIG. 1 is a functional block diagram illustrating an error resolution environment, in accordance with an exemplary embodiment of the present invention.

Embodiments of the present intention recognize that the identification of errors can include approaches such as adding programming to generate and collect detailed trace information during the entire execution of the program. This approach often results in a general slowing of the program and system in which the program operates. The result is a large amount of trace data, most of which has nothing to do with the error. Sorting through such a large amount of trace data is time consuming and often costly for the program developer.

Other approaches modify the runtime of the program to generate additional trace data. This approach is often invasive for the customer since such a modification would require stopping, redeploying and restarting of the program, and can slow an entire network. A last approach is to use known predicted error conditions and known class or method entry and exit points in the program, sometimes in combination with code injection. However, this approach is limited to known conditions that can initiate an error expression.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor that is comprised of hardware of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating an error resolution environment, generally designated 100, in accordance with one embodiment of the present invention. Error resolution environment 100 includes computing device 110. Computing device 110 includes trace information program 112, initial trace output 114, annotated trace output 116, secondary trace output 118, additional trace information 120, and product program 122.

In various embodiments of the present invention, computing device 110 is a computing device that can be a standalone device, a video game console, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to trace information program 112, initial trace output 114, annotated trace output 116, secondary trace output 118, additional trace information 120, and product program 122 and is capable of running trace information program 112. Computing device 110 may include internal and external hardware components, as depicted and described in further detail with respect to FIG. 3.

In this exemplary embodiment, trace information program 112, initial trace output 114, annotated trace output 116, secondary trace output 118, additional trace information 120, and product program 122 are stored on computing device 110. However, in other embodiments, trace information program 112, initial trace output 114, annotated trace output 116, secondary trace output 118, additional trace information 120, and product program 122 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110 and trace information program 112, initial trace output 114, annotated trace output 116, secondary trace output 118, additional trace information 120, and product program 122 in accordance with a desired embodiment of the present invention.

In exemplary embodiments, trace information program 112 accesses an initial trace output, included in initial trace output 114 that was generated after an error was experienced by a product program, included in product program 122. Trace information program 112 annotates the initial trace output with code, identifying one or more patterns of logged events that indicate a suspected error condition. In some instances, a suspected error condition is a set of trace records that have a built-in start and end point that is indicated by a single pattern. In other instances, two separate patterns are used to identify a start point and end point respectively Trace information program 112 also annotates the initial trace output with at least one program, included in annotated trace output 116, that, when executed, will gather additional trace information.

In exemplary embodiments, the annotated trace output is accessed by trace information program 112 during a second execution of the product program. Trace information program 112 uses the annotated trace output to monitor a second trace output of logged events, included in secondary trace output 118. Trace information program 112 monitors the second trace output of logged events for instances of a pattern matching the pattern of the suspected error condition. If the pattern of the suspected error condition is identified, then trace information program 112 executes the programs, included in annotated trace output 116. The programs, included in annotated trace output 116 gather additional trace information, which increases the degree of gathering logged events. In the case that a pattern of the suspected error condition includes a start and end point in a single pattern, e.g., a set of trace records that have a built-in start and end point, then, once the end of the pattern is reached, trace information program 112 ceases execution of the programs that gather additional trace information. Trace information program 112 then returns to the normal degree of trace information gathering, i.e., additional trace information is no longer gathered. The gathered additional trace information is saved as part of additional trace data 120.

In exemplary embodiments, if the pattern of the suspected error condition includes separate respective patterns for a start point and an end point, then trace information program 112 monitors the second trace output of logged events for instances of the start pattern. If the start pattern of the suspected error condition is identified, then trace information program 112 begins execution of the programs that gather additional trace information. Trace information program 112 continues the execution of the programs that gather additional trace information until trace information program 112 identifies the pattern of logged events that indicate the end point of the suspected error condition. Once trace information program 112 identifies the pattern of logged events that indicate the end point of the suspected error condition, then trace information program 112 returns to the normal degree of trace information gathering. The gathered additional trace information is saved as part of additional trace data 120. The additional trace information, included in additional trace data 120 can be used to identify and correct the error experienced by the product program.

The selective activation, e.g., in response to a pattern of an error condition, of the programs that gather additional trace information allow the gathering of additional logged events and trace information without unnecessary hindrance to the system executing the product program. Additional trace information and logged events are only gathered after the pattern of an error condition is identified. As a result, the demands on the resources of the system executing the product program are minimized during the gathering of additional trace information.

In exemplary embodiments, initial trace output 114, includes an initial trace output that was generated after an error was experienced by a product program. The initial trace output can be analyzed by a user to identify logged event patterns that correlate to a possible error condition that was experienced by the product program. In some embodiments, a user can annotate the initial trace output which is then saved as part of annotated trace output 116. In certain embodiments, trace information 112 includes programming that can identify and annotate an initial trace output with logged event patterns that correlate to a possible error condition that was experienced by the product program.

In exemplary embodiments, annotated trace output 116 includes logged event patterns that correlate to a possible error condition experienced by the product program. For example, patterns of repeated calls to certain methods. Annotated trace output 116 also includes several programs that, when executed, will gather additional trace information during an execution of the product program. For example, a program that will gather additional trace information can create Java cores from a Java Virtual Machines (JVMs). In another example, the program that will gather additional trace information changes the level of trace in the process that will be generated; sometimes for a specified duration. Many programs that will gather additional trace information cause a persistent storage of logged and traced events in, for example, a memory or a buffer, at least until the additional trace information is saved as part of additional trace information 120. Trace information program 112 combines the logged event patterns and at least one of the several programs that can gather additional trace information, with the initial trace output to generate an annotated trace output, which is then saved as part of annotated trace output 116.

In exemplary embodiments, secondary trace output 118 includes a second trace output of logged events that is generated during a second, or subsequent, execution of the product program. Secondary trace output 118 is updated in real time during another execution of the product program.

In exemplary embodiments, additional trace information 120 includes additional logged events, which can include additional trace information. Additional logged events are logged events that are gathered, by the programs that gather additional trace information, during the second execution of the product program. Additional logged events are logged events which are not gathered during normal trace activities, i.e., additional logged events are logged events that were not included in the initial trace output. In some instances, additional logged events can include diagnostic information. The additional logged events can be herein referred to as additional trace information. Additional trace information 120 is updated in real time during the second execution of the product program.

In exemplary embodiments, product program 122 includes the program that experienced the error. Trace information program 112 accesses and executes the program, included in product program 122, to generate trace outputs as needed.

Figure 2:
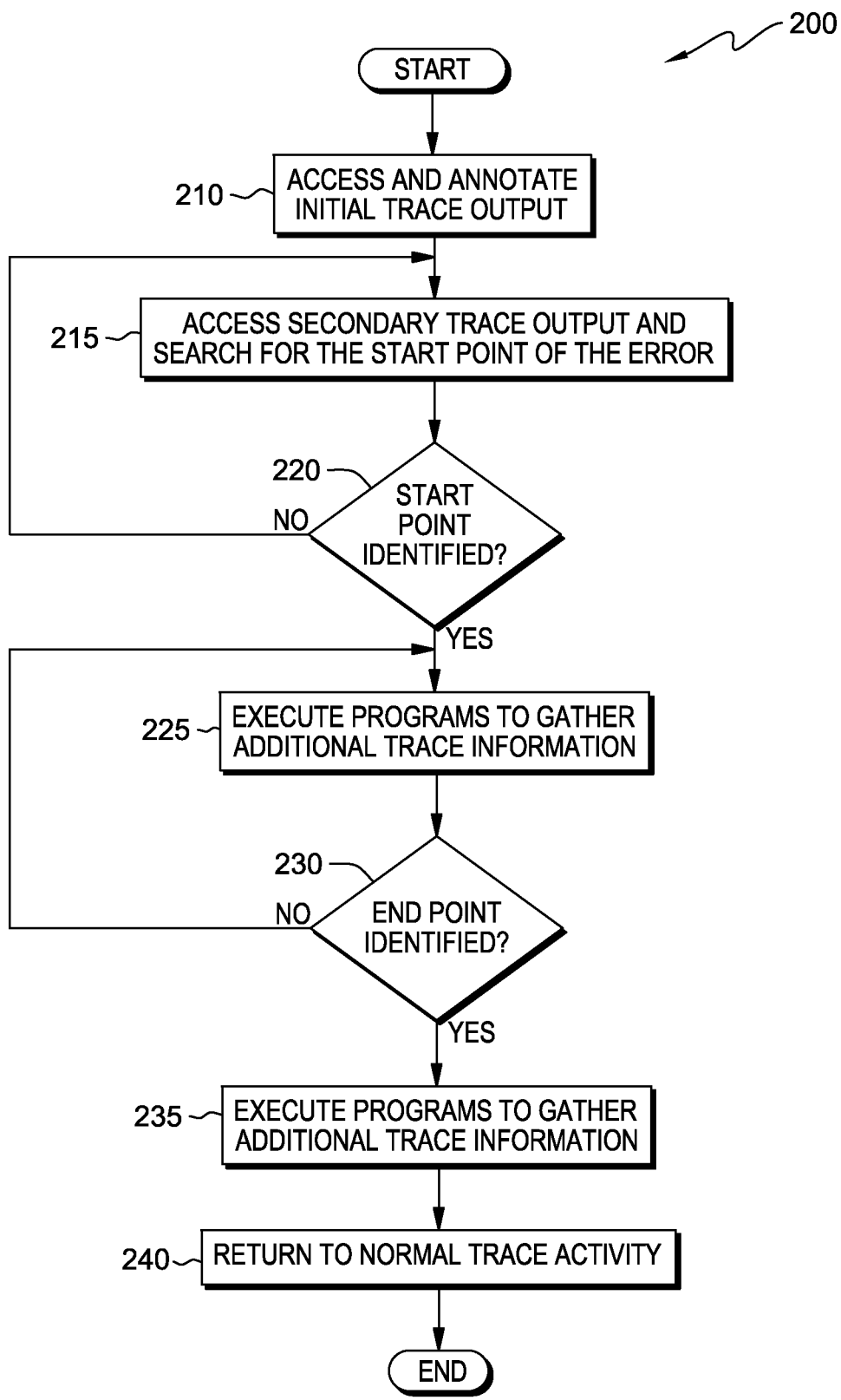
FIG. 2 illustrates operational steps of a trace information program, on a computing device within the error resolution environment of FIG. 1, in accordance with an exemplary embodiment of the present invention.

FIG. 2 is a flow chart, 200, illustrating the operational steps utilized by trace information program 112 to capturing trace information, e.g., additional logged events, to identify the source of an error, in accordance with an exemplary embodiment.

In step 210, trace information program 112 accesses and annotates an initial trace output, included in initial trace output 114, to include the logged event patterns that correlate to an error condition experienced by the product program, i.e., the pattern of the suspected error condition. Trace information program 112 also annotates the initial trace output to include a program that, when executed, will gather additional trace information. The now annotated trace output is saved as part of annotated trace output 116. For example, a given program experiences a crash and generates an initial trace output which is saved as part of initial trace output 114. The customer sends the initial trace output to the developer of the program. The developer analyzes the initial trace output for patterns indicating the error condition that caused the crash. After being identified, the pattern of the suspected error condition and the programs to be executed, when that pattern is encountered again, are sent to the customer and saved as part of annotated trace output 116. Trace information program 112 is then executed. Trace information program 112 accesses the pattern of the suspected error condition and the programs that gather additional trace information, included in annotated trace output 116, and uses them to annotate the initial trace output, included in initial trace output 114. The now annotated trace output is saved as part of annotated trace output 116.

In step 215, trace information program 112 accesses secondary trace output 118 and begins to search the second trace output, being collected in secondary trace output 118, for the pattern of the suspected error condition. If the pattern of the suspected error condition includes a separate start point of the error, i.e., the event pattern correlating to the start point of the error experienced by the product program, then trace information program 112 searches the second trace output for instances of the start pattern. As new logged events are added to the second trace output, included in secondary trace output 118, trace information program 112 compares the newly logged events to the event pattern correlating to the pattern of the suspected error condition, or the start point of the error when applicable.

In decision step 220, trace information program 112 determines if the pattern, i.e., the pattern of the suspected error condition or the start pattern, has been identified. If the pattern has not been identified (decision step 220, no branch), then trace information program 112 proceeds to step 215 and continues to search for the pattern. If the pattern has been identified (decision step 220, yes branch), then trace information program 112 proceeds to step 225. For example, the pattern of the suspected error condition is identified by a pattern of several sequential method X calls, so trace information program 112 monitors the call log of the product program for that pattern. Trace information program 112 identifies the pattern of several sequential method X calls in the call log and determines that the suspected error condition has been identified.

In step 225, trace information program 112 executes the programs, included in annotated trace output 116, to gather additional trace information. Trace information program 112 proceeds to decision step 230. For example, the program gathering additional trace information executes a dump of a stack trace of a thread, which is then saved, by trace information program 112, as part of additional trace information 120. In another example, the program gathering additional trace information generates a system core of the executing process and trace information program 112 saves that information as part of additional trace information 120.

In decision step 230, trace information program 112 determines if the end of the suspected error condition has been identified. If the end of the suspected error condition has not been identified (decision step 230, no branch), then trace information program 112 returns to step 225 and continues to gather additional trace information. If the end of the suspected error condition has been identified (decision step 230, yes branch), then trace information program 112 proceeds to step 235. If the suspected error condition includes a separate pattern that indicates an end point of the suspected error condition, then trace information program 112 will identify that pattern and determine that the end of the suspected error condition has been identified. For example, the end point is identified by a pattern of four method Z calls and 5 method Y calls, so trace information program 112 monitors the call log of the product program for that pattern. Trace information program 112 identifies the pattern of four method Z calls and 5 method Y calls, in the call log, and determines that the end point of the error has been identified.

In step 235, trace information program 112 stops the execution of programs to gather additional trace information. The additional trace information is saved as part of additional trace information 120. In step 240, trace information program 112 returns to a normal degree of trace activity.

In some embodiments, trace information program 112 includes additional programming to analyze initial trace outputs to identify patterns that correlate to suspected error conditions. In some instances this can include the identification of the start point and end point of errors. In other words, trace information program 112 is able to determine the patterns of events that may indicate error conditions.

In some embodiments, trace information program 112 includes additional programming to execute in an autonomic manner. Such an embodiment can specify which event, combination of events, or sequence of events to search for, over a specified time interval. In such an autonomic embodiment, trace information program 112 would automatically notice anomalous patterns of events, based on events occurring in the system and previous patterns known to be normal, and would determine which condition to watch for based on these anomalous patterns. For example, an anomalous pattern to watch for can include a single log or trace event, a sequence of log or trace events. The anomalous pattern can include a time period criteria. For example, a sequence of trace events that occur within a specified period of time. Further, the anomalous pattern can be identified by annotating previously persisted trace output, which can also be annotated to include a time period criteria.

Figure 3:
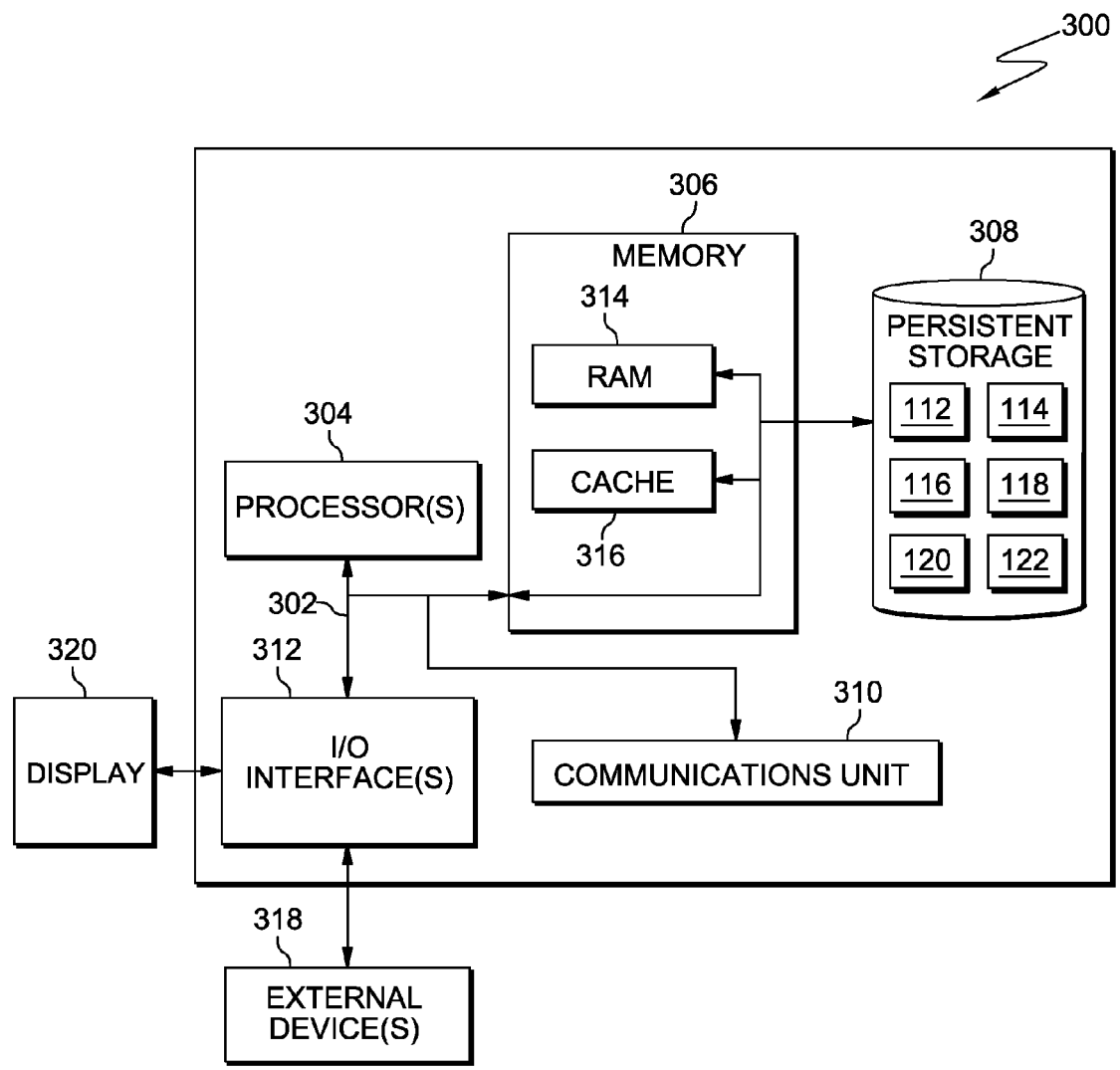
FIG. 3 depicts a block diagram of components of the computing device executing the trace information program, in accordance with an exemplary embodiment of the present invention.

FIG. 3 depicts a block diagram, 300, of components of computing device 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Trace information program 112, initial trace output 114, annotated trace output 116, secondary trace output 118, additional trace information 120, and product program 122 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. Trace information program 112, initial trace output 114, annotated trace output 116, secondary trace output 118, additional trace information 120, and product program 122 may be downloaded to persistent storage 308 through communications unit 310.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., trace information program 112, initial trace output 114, annotated trace output 116, secondary trace output 118, additional trace information 120, and product program 122, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for capturing event information, the computer program product comprising:
   one or more computer-readable storage media and program instructions stored on the one or more computer-readable storage media, the program instructions comprising:
   program instructions to access a first trace output, generated during a first execution of a first program;
   program instructions to annotate the first trace output with an indication of a first pattern of logged events that indicate a suspected error condition;
   program instructions to annotate the first trace output with one or more second programs that identify additional logged events;
   program instructions to access a second trace output, generated during a second execution of the first program, the second trace output having a second pattern of logged events;
   program instructions to monitor the second pattern of logged events for a match to the first pattern of logged events; and
   program instructions to respond to an identification of a match of the first pattern of logged events to the second pattern of logged events, by executing the one or more second programs to gather one or more additional logged events that are discoverable during the second execution of the first program, wherein the one or more additional logged events are not included in the first trace output.

2. The computer program product of claim 1, the program instructions further comprising:
   program instructions to determine that an end of the first pattern of logged events in the second trace output has been reached; and
   program instructions to respond to the determination that the end of the first pattern of logged events in the second trace output has been reached, by ceasing execution of the one or more second programs.

3. The computer program product of claim 1, wherein program instructions to identify a first trace output, generated during a first execution of a first program, that is annotated with an indication of a first pattern of logged events and one or more second programs that identify additional logged events includes:
   program instructions to receive a first trace output generated during the first execution of the first program; and
   program instructions to generate an annotated first trace output by adding code to the first trace output, wherein the added code includes at least one pattern of logged events that is used to identify a starting point and a stopping point for the execution of the one or more second programs that identify additional logged events.

4. The computer program product of claim 1, wherein the program instructions to determine that an end of the first pattern of logged events in the second trace output has been reached includes:
   program instructions to identify a second pattern of logged events that is used to identify an ending point for the execution of the one or more programs that identify additional logged events, wherein the first trace output is annotated to include the second pattern of logged events.

5. The computer program product of claim 1, wherein the execution of the one or more second programs to identify one or more additional logged events constitutes an increased degree of trace activity.

6. The computer program product of claim 1, wherein cessation of execution of the one or more second programs to identify one or more additional logged events constitutes a return to a normal degree of trace activity.

7. The computer program product of claim 1, wherein the annotation of the first trace output indicates a suspected cause of an error that was observed during the first execution of the first program that generated the first trace output.

8. The computer program product of claim 1, wherein the one or more second programs gather one or both of trace information and logged event information that was not present in the first trace output.

9. A computer system for capturing event information, the computer system comprising:
   one or more computer processors;
   one or more computer readable storage medium;
   program instructions stored on the computer readable storage medium for execution by at least one of the one or more processors, the program instructions comprising:
   program instructions to access a first trace output, generated during a first execution of a first program;
   program instructions to annotate the first trace output with an indication of a first pattern of logged events that indicate a suspected error condition;
   program instructions to annotate the first trace output with one or more second programs that identify additional logged events;
   program instructions to access in a second trace output, generated during a second execution of the first program, the second trace output having a second pattern of logged events;

program instructions to monitor the second pattern of logged events for a match to the first pattern of logged events; and program instructions to respond to an identification of a match of the first pattern of logged events to the second pattern of logged events, by executing the one or more second programs to gather one or more additional logged events that are discoverable during the second execution of the first program, wherein the one or more additional logged events are not included in the first trace output.

10. The computer system of claim 9, the computer system further comprising:

program instructions to determine that an end of the first pattern of logged events in the second trace output has been reached; and program instructions to respond to the determination that the end of the first pattern of logged events in the second trace output has been reached, by ceasing execution of the one or more second programs.

11. The computer system of claim 9, wherein program instructions to identify a first trace output, generated during a first execution of a first program, that is annotated with an indication of a first pattern of logged events and one or more second programs that identify additional logged events includes:

program instructions to receive a first trace output generated during the first execution of the first program; and program instructions to generate an annotated first trace output by adding code to the first trace output, wherein the added code includes at least one pattern of logged events that is used to identify a starting point and a stopping point for the execution of the one or more second programs that identify additional logged events.

12. The computer system of claim 9, wherein the program instructions to identify that an end of the first pattern of logged events in the second trace output has been reached includes:

program instructions to identify a second pattern of logged events that is used to identify an ending point for the execution of the one or more programs that identify additional logged events, wherein the first trace output is annotated to include the second pattern of logged events.

13. The computer system of claim 9, wherein the execution of the one or more second programs to identify one or more additional logged events constitutes an increased degree of trace activity.

14. The computer system of claim 9, wherein cessation of execution of the one or more second programs to identify one or more additional logged events constitutes a return to a normal degree of trace activity.

15. The computer system of claim 9, wherein the annotation of the first trace output indicates a suspected cause of an error that was observed during the first execution of the first program that generated the first trace output.

16. The computer system of claim 9, wherein the one or more second programs gather one or both of trace information and logged event information that was not present in the first trace output.

* * * * *